(No Model.)
W. C. CODDINGTON.
Caster.
No. 238,355. Patented March 1, 1881.
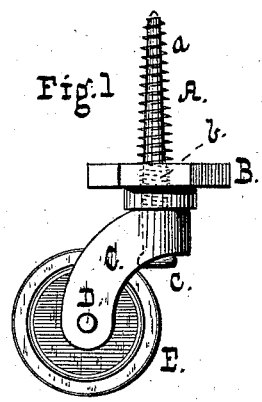
Witnesses,
Inventor,
W. C. CODDINGTON
by
Attorney.

UNITED STATES PATENT OFFICE.

WILLIAM C. CODDINGTON, OF BALTIMORE, MARYLAND.

CASTER.

SPECIFICATION forming part of Letters Patent No. 238,355, dated March 1, 1881.

Application filed August 9, 1880. (No model.)

*To all whom it may concern:*

Be it known that I, WILLIAM C. CODDINGTON, of Baltimore city, State of Maryland, have invented certain new and useful Improvements in Casters; and I hereby declare the same to be fully, clearly, and exactly described as follows, reference being had to the accompanying drawings, in which—

Figure 1 is a side elevation of a caster embodying my present invention. Fig. 2 is a similar view of the securing-screw and pivot-pin.

My invention relates to furniture-casters of that general class in which the yoke between the arms of which the roller is pivoted revolves about a pivot which is integral with or rigidly affixed to the screw that secures the caster in the article of furniture under which it is used; and it has for its object to cheapen the construction of the device and facilitate the combination of its parts. These ends are secured by casting the flange and pivot separately and providing the latter with two threads, respectively right and left, for securing it in the flange and in the table or chair leg or other article under which the caster is placed.

In the accompanying drawings, A is the combined pivot and screw, having on its upper portion a wood thread, $a$, and immediately below the same a left-handed metal thread, $b$, of such length on the screw as to fill the thickness of the flange B. This latter is of the usual external shape, but is threaded in its central aperture to fit the screw $b$. The portion of the pivot A immediately below the screw $b$ is cylindrical, as shown at $d$, and a head, $c$, completes the pivot. The yoke C, pivot D, and roller E are of the usual construction.

In order to insert the caster, the yoke C is slipped over the pivot-pin, and after it the flange B, which is screwed home until its under side meets the cylindrical part $d$. The wood screw $a$ is then inserted in the article of furniture by means of a spanner or wrench, as usual.

The object of right and left threading the parts $a\ b$ of the screw is to prevent the unscrewing of the flange as the caster is inserted.

The entire pivot-pin tapers progressively from head to point, the screw $a$ being smaller in cross-section than the screw $b$, but larger than the cylinder $d$, the object being to secure a close and accurate fit of the yoke on the part $d$ and of the flange on the screw $b$, while admitting of the yoke and flange being readily slipped to their respective places. The described construction secures the parts firmly together, while admitting of the caster being constructed very cheaply.

Instead of threading the part $b$ it may be made square or polygonal.

No riveting of the pivot-pin is required, and it may be made outright by machinery.

The flange is of cast metal, as is the yoke, and no hand-labor whatever is required to fit the parts together beyond the riveting of the pivot D and screwing on the flange B.

What I claim is—

In a caster, a pivot-pin having reversely-threaded portions $a$ and $b$, the latter carrying the flange, as and for the purpose set forth.

WILLIAM C. CODDINGTON.

Witnesses:
   G. N. JACOBI,
   SAML. G. B. COOK.